Feb. 25, 1969　　　C. P. O'REGAN　　　3,430,083

VARIABLE RELUCTANCE STEPPER MOTOR

Filed Dec. 7, 1966

INVENTOR
Charles P. O'Regan
BY S. A. Giarratana &
K. A. Chralik
ATTORNEYS

United States Patent Office 3,430,083
Patented Feb. 25, 1969

3,430,083
VARIABLE RELUCTANCE STEPPER MOTOR
Charles P. O'Regan, Bronx, N.Y., assignor to General Precision Systems Inc., a corporation of Delaware
Filed Dec. 7, 1966, Ser. No. 599,832
U.S. Cl. 310—49    9 Claims
Int. Cl. H02k 37/00

ABSTRACT OF THE DISCLOSURE

A two-phase, center tap winding stepper motor which provides non-resonant stepping movement of the rotor by means of a magnetic damping effect caused by a particular sequence of energization of the stator coils. Adjacent pairs of oppositely wound stator coils are sequentially energized to produce a magnetic field. The rotor seeks to provide a low-reluctance path between each pair of energized coils in a sequential manner to produce a stepping operation.

---

Figure 1:
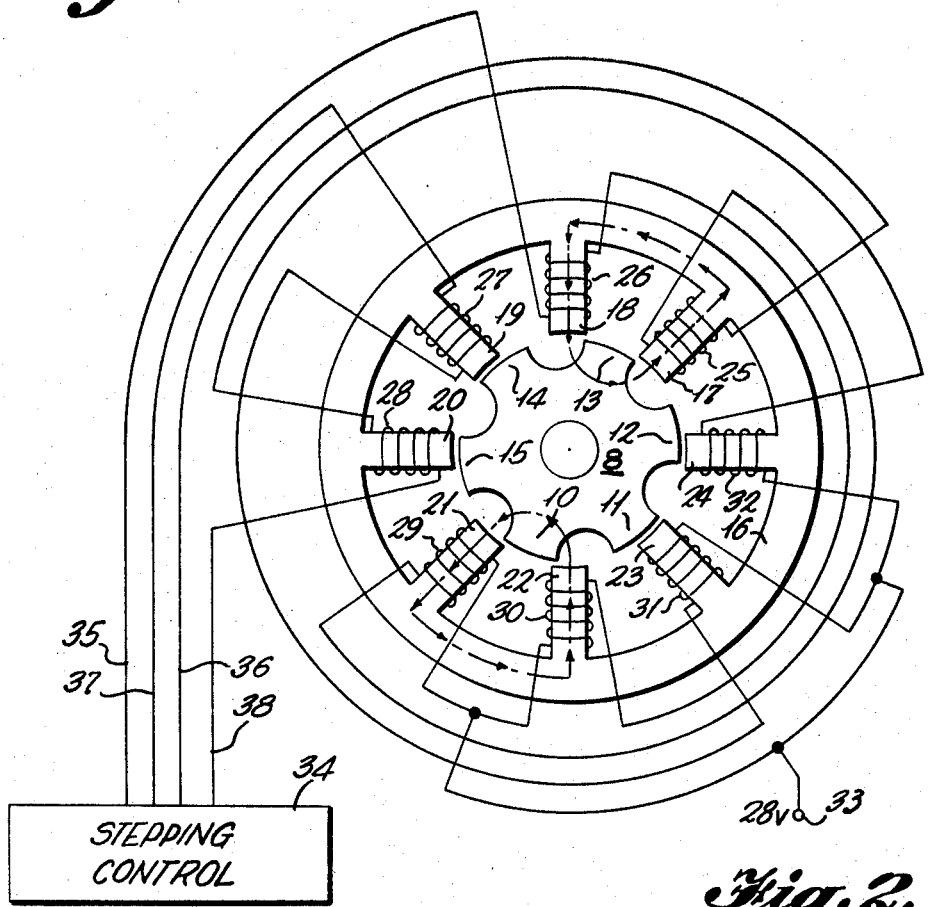

This invention relates to a variable reluctance type stepper motor capable of non-resonant operation throughout its entire speed range, and more particularly, to a two-phase center tap winding motor constructed to provide non-resonant operation.

When stepper motors are operated at high speeds, erratic operation is commonplace. This occurs because of the tendency of the rotor to oscillate back and forth at the stopping position rather than to come to a smooth stop. This is particularly true when the stepping rate of the motor coincides with the major peak of the oscillation movement. In order to avoid this shortcoming, the prior art stepper motors cannot be operated at this resonant stepping rate which places limitations on its applications.

It has been attempted to overcome this erratic operation at the resonant stepping rate by the use of various viscous coupled inertia dampers. The use of such dampers have been found to be effective under starting conditions, but has little or no effect in compensating for unstable running speed when the inertia attains synchronism with the motor shaft speed and due to the coupling, the problem of instability is increased. Furthermore, such inertia dampers increase the size and weight of the motor. Other problems, including those of temperature and loss of torque at high speeds, also make the use of inertial dampers undesirable for most stepper motor applications.

In application Ser. No. 443,278, entitled, "Variable Reluctance Stepper Motor Damper" now U.S. Patent 3,385,984, a system was described which overcame many of the prior art disadvantages by providing a magnetic damping between the rotor and the stator. This was accomplished by generating a magnetic field in addition to the magnetic field which causes the stepping between the rotor and the stator. However, this system was adapted for and employs three-phase stepper motors.

In the system of the present invention, a magnetic damping against resonance is provided between the rotor and the stator of a two-phase variable reluctance type stepper motor. This damping is accomplished without any mechanical attachments, inside or outside of the stepper motor. The damping magnitude of the present invention, like torque, is a direct function of the winding current and is inversely proportional to speed and temperature.

The stepper motor of the present invention is provided with a stator and rotor each having a different number of poles with the stator poles being wound with coils. A control means energizes oppositely disposed pairs of coils wound on adjacent poles in a sequential manner to cause the rotor to rotate in incremental steps with a pole of the rotor being positioned between the two magnetized stator poles which creates a damping effect for smooth operation.

Among the objects of the present invention therefore are the provision of a two-phase stepper motor having a magnetic damping means provided to overcome resonance and to provide a novel stator coil winding and energizing means to produce non-resonant step-by-step movement of the rotor of the motor.

Other objects and further scope of applicability of the present invention will become apparent from the detailed description to follow, taken in conjunction with the accompanying drawings in which:

FIG. 1 schematically illustrates a stepping motor of the present invention; and

Figure 2:
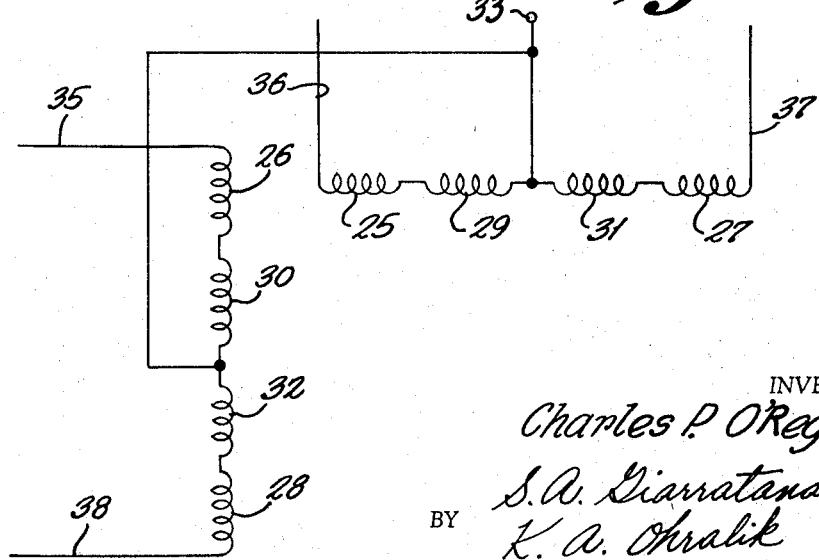

FIG. 2 is a circuit diagram illustrating the wiring connections of the stepper motor of FIG. 1.

As shown in FIG. 1, the rotor 8 is comprised of six radially extending poles 10, 11, 12, 13, 14 and 15 which are evenly distributed about the axis of the rotor 8. The rotor 8 is made of conventional laminations of magnetically permeable material, preferably soft iron. The stator 16, which is also constructed of magnetically permeable laminations, includes eight pole pieces 17–24 which have coils 25–32 wound thereon. The coils 25–32 are wound on the stator poles 17–24 in a two-phase configuration. For example, coils 25 and 29, which form one half of a phase winding are wound on diametrically opposite stator poles 17 and 21. Two coils wound on poles displaced from each other by 180° form one half of a phase winding. The coils 25–32 are connected in series with a 28 volt DC source of supply which is applied at terminal 33, and a stepping control unit 34 which is preferably a transistorized logic drive circuit. The circuit diagram of FIGURE 2 shows more clearly how the windings are connected in the two-phase winding configuration. The control unit 34 excites two adjacent and oppositely wound halves of each phase simultaneously with the direct current input to produce a magnetic field between the windings by placing ground on selected ones of the conductors 35, 36, 37 and 38 which connect to the coils to complete a circuit through the 28 volt DC supply source. The control unit 34 operates to energize the various adjacent coil combinations in a sequential stepping manner. For example, during the first step, the control unit energizes adjacent coils 25 and 26 and their opposite complementary coils 29 and 30 by grounding leads 35 and 36. The second step of the control unit 34 energizes coils 26 and 27 and their opposite coils 30 and 31 by grounding leads 35 and 37. In step three, coils 27 and 28 and their opposite coils 31 and 32 are energized by grounding leads 37 and 38. In the fourth step coils 28 and 25 and their opposite coils 32 and 29 are energized by grounding leads 38 and 36. These steps are cyclically repeated to provide a continuous stepping sequence.

When conductors 35 and 36 are grounded by the stepper control 34, current flows from terminal 33 through coils 25, 26, 29 and 30. These coils are so poled so that ground applied by the stepper control unit 34 will create north pole magnetic field polarity direction at poles 18 and 22 and a south pole polarity at poles 17 and 21. On the next step when the control unit 34 grounds conductors 35 and 37 and the coils 26, 27, 30 and 31 are energized, poles 19 and 23 become south poles while poles 18 and 22 remain north poles. On the next step when the control unit 34 grounds leads 37 and 38 and coils 27, 28, 31 and 32, are energized, poles 19 and 23 remain south poles while poles 20 and 24 become north poles. On the next step, when the control unit grounds leads 36 and 38 and coils 25, 28, 29 and 32 become energized, poles 17 and 21 again become south poles and poles 20 and 24 remain north poles. Then each adjacent pair of poles and pole windings are energized in sequence. Since the adjacent poles are oppositely polarized, a magnetic field is developed between them. For example, when coils 25 and 26 and 29 and 30 are energized, the magnetic fields shown by the dotted lines in FIG. 1 are produced. With the coils producing a magnetic field, the rotor seeks to provide the lowest reluctance path for the magnetic fields and two diametrically opposite rotor poles, numbered 13 and 10, position themselves as shown in FIGURE 1 midway between the energized poles 17 and 18 and 21 and 28. While four of the stator poles are magnetized thereby attracting two of the rotor poles into minimum reluctance paths, the four idle rotor poles straddle the unexcited stator teeth. A transition from one step to the next, causes the stator fields to move to the next adjacent pairs of poles and draw an idle pair of diametrically opposite rotor teeth into alignment. Thus on the next step when poles 18, 19, 22 and 23 are magnetized, the rotor will rotate clockwise to move the rotor poles 14 and 11 to positions halfway between the adjacent magnetized poles 18 and 19 and 22 and 23. This results in a 15° step angle which represents the difference between the stator pitch of 45° per pole and the rotor pitch of 60° per pole. On the next step when poles 19 and 20, 23 and 24 are magnetized, the rotor will rotate 15° in a clockwise direction to move the rotor poles 15 and 12 to midway between the adjacent magnetized poles 19 and 20 and 23 and 24. On the next step the rotor again rotates 15° to position its poles 10 and 13 midway between the adjacent magnetized stator poles 20 and 21 and 17 and 24. On the next step when the poles 17, 18, 21 and 22 are again magnetized, the rotor poles 14 and 11 will be moved to between these stator poles. Thus as the energization of the coils is cyclically repeated by grounding selected pairs of the leads 35 to 38 in the sequence described above, the rotor will step in 15° increments.

With the construction described above, the motor can respond to all stepping rates from zero to the maximum no load rate without interruption by resonant speeds because of the magnetic damping that occurs due to the tendency of the rotor poles to seek the low-reluctance path. By positioning its poles midway between the poles producing the magnetic field, there are two magnetic forces which act upon the rotor, each in an opposite direction, which prevent oscillatory movement in either direction.

The construction and operation outlined above can be utilized effectively in other two-phase configurations such as, for example, in a motor that has twelve rotor teeth and sixteen stator teeth with four sets of coils each. Using the same two-phase electrical sequence as before, 7½° step increments will result.

It will be appreciated that the above description is illustrative only and not limiting and many modifications may be made to the specific embodiment described above without departing from the spirit and scope of the invention, which is defined in the appended claims.

What is claimed is:
1. A stepper motor comprising a rotor and a stator of magnetically permeable material, said rotor having a plurality of poles distributed about its axis and extending toward said stator, said stator having a plurality of poles distributed about the axis of said rotor and extending toward said rotor, said stator having a different number of poles than said rotor, a plurality of coils wound upon the poles of said stator, and control means to energize selected pairs of said coils in sequence, the coils of each selected pair being on adjacent poles of said stator and being energized by said control means to magnetize said adjacent poles with opposite polarities, said sequence being such to cause said rotor to rotate in incremental steps with a pole of said rotor being positioned between two magnetized stator poles on each of said steps.

2. A stepper motor as recited in claim 1 wherein said stator surrounds said rotor and said rotor and said stator poles are radially extending.

3. A stepper motor as recited in claim 1 wherein said stator has more poles than said rotor.

4. A stepper motor as recited in claim 1 wherein each coil which is not in a selected pair of coils on a given step is in a deenergized condition in such step.

5. A stepper motor as recited in claim 1 wherein each selected pair of coils energized by said control means on each succeeding step includes one coil from a selected pair of coils energized by said control means on the preceding step.

6. A stepper motor as recited in claim 1 wherein said rotor has six poles and said stator has eight poles and said control means energizes two pairs of said coils on each step on opposite sides of the axis of said rotor on each step.

7. A stepper motor as recited in claim 6 wherein the coils on poles between the two selected pairs of coils energized on a given step are in a deenergized condition in such step.

8. A stepper motor as recited in claim 6 wherein each pair of coils energized by said control means on each succeeding step includes one coil from a pair of coils energized by said control means on the preceding step.

9. A two-phased center tapped stepper motor adapted to produce non-resonant operation comprising, a stator having a number of poles, a rotor having a lesser number of poles, a first set of alternate poles of said stator having windings to produce a magnetic field in a first polarity direction, adjacent poles of said stator having windings opposed to said windings on first set of poles to produce a magnetic field of a second polarity direction, means to selectively energize first and second pairs of said windings on adjacent poles on opposite sides of the axis of said rotor to produce a magnetic field whereby two poles of said rotor are moved in a first position midway between said energized windings to form a low-reluctance path and to thereafter energize a third and fourth pairs of said windings on adjacent poles of said stator on the opposite sides of the axis of said rotor thereby causing said rotor to move from said first position to a second position whereby two poles of said rotor midway between said third and fourth pairs of energized windings to form another low-reluctance path.

References Cited
UNITED STATES PATENTS

| | | | |
|---|---|---|---|
| 3,024,399 | 3/1962 | Valentino | 310—49 X |
| 3,117,268 | 1/1964 | Madsen | 310—49 X |
| 3,327,185 | 6/1967 | Kawada | 318—138 X |
| 3,381,193 | 4/1968 | Smith | 318—138 |
| 3,385,984 | 5/1968 | O'Regan | 310—49 |

WARREN E. RAY, *Primary Examiner.*

U.S. Cl. X.R.

318—138